(12) United States Patent
Khouderchah et al.

(10) Patent No.: US 7,787,478 B2
(45) Date of Patent: Aug. 31, 2010

(54) MANAGING TRAFFIC WITHIN AND BETWEEN VIRTUAL PRIVATE NETWORKS WHEN USING A SESSION BORDER CONTROLLER

(75) Inventors: Michel Khouderchah, Cupertino, CA (US); Chandrasekar Krishnamurthy, Sunnyvale, CA (US); Doron Oz, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 650 days.

(21) Appl. No.: 11/370,294

(22) Filed: Mar. 7, 2006

(65) Prior Publication Data

US 2007/0211715 A1 Sep. 13, 2007

(51) Int. Cl.
*H04L 12/28* (2006.01)
(52) U.S. Cl. .................. 370/401; 370/392; 370/352
(58) Field of Classification Search ............. 370/392, 370/235, 395, 397, 409
See application file for complete search history.

(56) References Cited

U.S. PATENT DOCUMENTS

| | | | |
|---|---|---|---|
| 6,693,878 B1 * | 2/2004 | Daruwalla et al. | 370/235 |
| 7,447,203 B2 * | 11/2008 | Chen et al. | 370/389 |
| 7,486,684 B2 * | 2/2009 | Chu et al. | 370/401 |
| 7,502,320 B2 * | 3/2009 | Oran | 370/231 |
| 2004/0165600 A1 | 8/2004 | Lee | |
| 2005/0147057 A1 | 7/2005 | LaDue | |
| 2005/0157664 A1 | 7/2005 | Baum et al. | |
| 2005/0198412 A1 | 9/2005 | Pederson et al. | |
| 2005/0254470 A1 | 11/2005 | Yashar | |
| 2006/0046714 A1 | 3/2006 | Kalavade | |
| 2007/0019619 A1 | 1/2007 | Foster et al. | |
| 2007/0071010 A1 | 3/2007 | Iyer et al. | |
| 2007/0116043 A1 * | 5/2007 | MeLampy et al. | 370/466 |
| 2007/0201481 A1 * | 8/2007 | Bhatia et al. | 370/395.2 |
| 2007/0211716 A1 * | 9/2007 | Oz et al. | 370/389 |
| 2009/0262723 A1 * | 10/2009 | Pelletier et al. | 370/352 |

OTHER PUBLICATIONS

Kaeo, Designing Network Security, Oct. 30, 2003, Cisco Press, Second Edition, 5, 8.*
Fox et al., RFC2685, Virtual Private Networks Identifier, Network Working Group, 2.*
www.Newport-networks.com, "Newport Networks Enhances Session Border Control With Industry-First Geographic Resilience and Link Aggregation," 3 pages total, Jun. 1, 2005, www.newport-networks.com/press/press050601-geographic.html.
www.acmepacket.com, "Acme Packet Net-Net session border controls," 4 pages total, 2006, http://www.acmepacket.com/images/Ap_Net-Net_datasheet060601.pdf.

(Continued)

*Primary Examiner*—Michael J Moore, Jr.
(74) *Attorney, Agent, or Firm*—Stolowitz Ford Cowger LLP

(57) ABSTRACT

Methods and devices for managing traffic at a session border controller (SBC) are described. A signal portion of traffic en route from a source in a virtual private network (VPN) to a destination is received. The signal portion has embedded therein an identifier that uniquely identifies the VPN. The identifier is accessed to determine whether the destination is also in the VPN. A decision whether to direct a media portion of the traffic to an SBC is made depending on whether or not the destination is outside of the VPN.

16 Claims, 7 Drawing Sheets

OTHER PUBLICATIONS

US PCT Office, "International Search Report" PCT/US07/61613, filing date Feb. 5, 2007, mail date Dec. 20, 2007, 2 pages and Written Opinion of the International Searching Authority, PCT/US07/61613, mail date Dec. 20, 2007, 4 pages.

Nishant B. Divecha, Final Office Action for U.S. Appl. No. 11/370,469, filed Mar. 7, 2009, Mail Date Jul. 8, 2009, 13 pages.
Nishant B. Evecha, Non-final Office Action issued in U.S. Appl. No. 11/370,469, mail date Jan. 21, 2010.

* cited by examiner

500

510
A SIGNAL PORTION OF TRAFFIC EN ROUTE FROM A SOURCE IN A VPN IS RECEIVED AT AN SBC

520
A UNIQUE IDENTIFIER EMBEDDED IN THE SIGNAL PORTION IS USED TO DETERMINE WHETHER THE DESTINATION OF THE TRAFFIC IS IN THE VPN

530
IF THE SOURCE AND DESTINATION ARE NOT IN THE SAME VPN, A MEDIA PORTION OF THE TRAFFIC IS DIRECTED TO THE SBC FOR PROCESSING

540
OTHERWISE, THE MEDIA PORTION BYPASSES THE SBC

Figure 5

MANAGING TRAFFIC WITHIN AND BETWEEN VIRTUAL PRIVATE NETWORKS WHEN USING A SESSION BORDER CONTROLLER

RELATED APPLICATION

This Application is related to U.S. patent application Ser. No. 11/370,469, filed Mar. 7, 2006, whose contents are incorporated herein for all purposes.

TECHNICAL FIELD

Embodiments of the present invention pertain to communication networks, and virtual private networks in particular.

BACKGROUND ART

A virtual private network (VPN) is an example of a private communication network. A VPN emulates a private, Internet Protocol (IP) network using shared or public network infrastructures such as the Internet. One type of VPN is implemented by configuring network devices (e.g., switches and routers) to establish a private, encrypted "tunnel" over a public network in order to secure VPN traffic against public access.

A VPN may encompass a number of virtual local area networks (VLANs). A VLAN consists of a network of computers or like devices, which behave as if they are connected to the same local wire but in fact may be in different locations (e.g., in different buildings, or even in different cities). Thus, devices may be a part of the same VPN although separated by large distances. A device such as a computer or a voice-over-IP (VoIP) phone can be identified as a member of a particular VLAN using a VLAN tag prescribed according to, for example, IEEE 802.1Q.

Session border controllers (SBCs) are used to provide services and to implement policies in VoIP communication networks. An SBC may be used, for example, to enable VoIP calls to be made to and from VPNs, from VPNs to a public switched telephone network (PSTN), or between phones that use different VoIP protocols.

An SBC may serve multiple VPNs, performing different services and implementing different policies for each. Also, the services performed and policies implemented by an SBC may depend on whether or not the traffic will remain within the VPN. Accordingly, it can be important to identify whether or not the calling and called parties are members of the same VPN and, if so, which VPN, in order to identify instances in which a service or policy associated with a particular SBC is not needed. In those instances, the SBC may be bypassed, thereby reducing overhead and shortening the communication path. More specifically, the SBC may direct the media portion of the traffic to bypass the SBC, while continuing to monitor the signaling portion of the traffic for further actions.

Currently, VLAN tags are used to associate traffic with a particular VPN. Each SBC is configured with mapping tables to map VLAN tags to VPN customer identifiers (IDs). The mapping tables are needed because VLAN tags are not globally unique, and so multiple SBCs may have different VLAN tags associated with the same VPN customer. Using the mapping tables, an SBC can determine whether the calling and called parties belong to the same VPN.

A problem with the conventional approaches is the effort needed to create and update the mapping tables on each of the SBCs in a VoIP network. The present invention provides a novel solution to this problem.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5 is a flowchart of a method for managing traffic in a network according to an embodiment of the present invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "accessing," "directing," "associating," "embedding," "forwarding" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
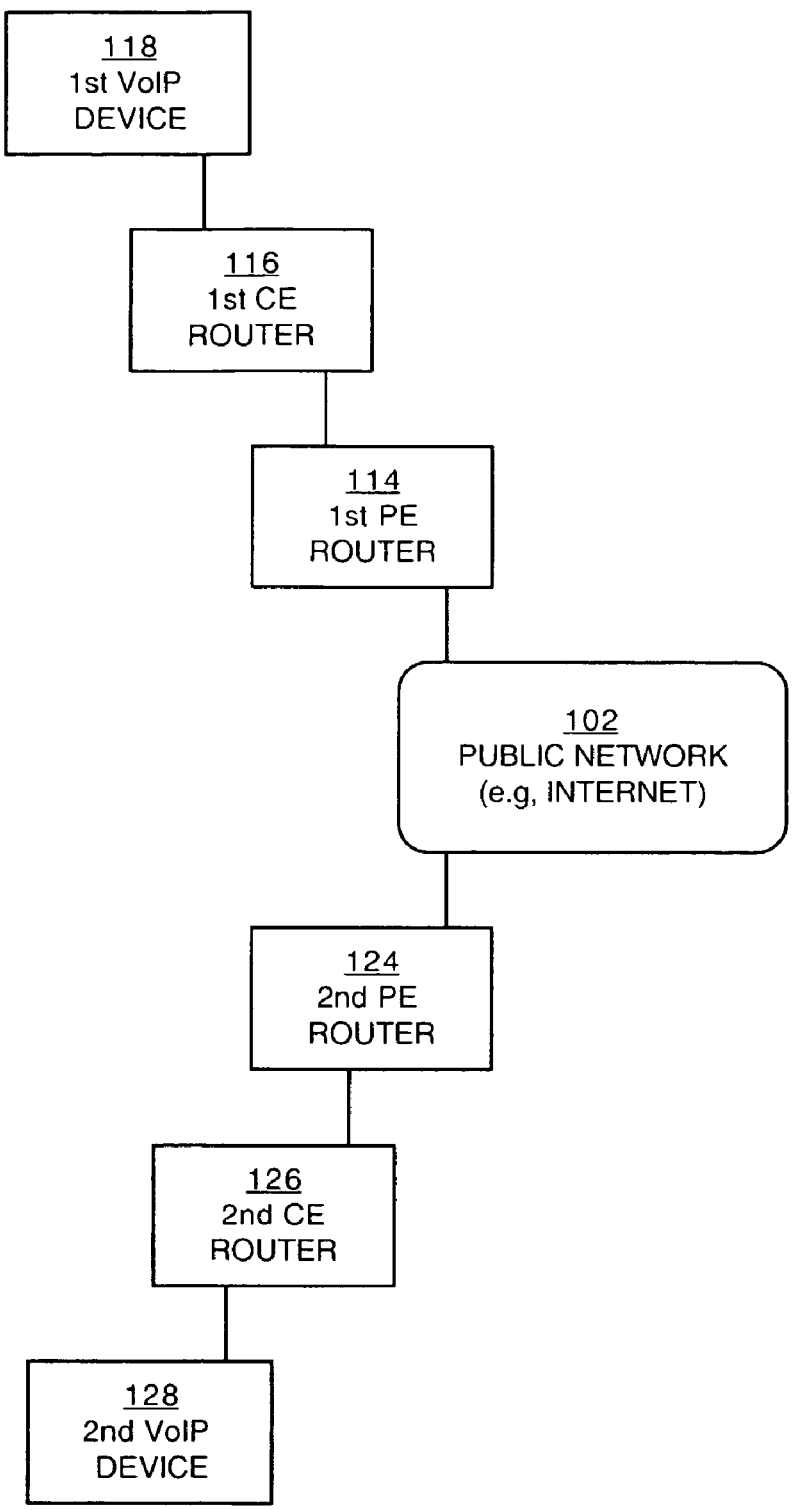
FIG. 1 is a block diagram of a network upon which embodiments in accordance with the present invention may be implemented.

FIG. 1 is a block diagram showing some of the elements of a network where embodiments in accordance with the present invention may be implemented. The example of FIG. 1 shows a first device 118 and a second device 128, each linked to a shared or public network 102, such as the Internet. In one embodiment, the devices 118 and 128 are devices that allow users to place voice-over-Internet Protocol (VoIP) calls. Although the present invention is discussed in the context of calls between VoIP devices, the present invention is not so limited. Generally speaking, traffic occurs between the devices 118 and 128, and the traffic contains media data (e.g., voice and/or video data) and also can contain signaling information.

The device 118 may be a member of one VLAN, and the device 128 may be a member of another VLAN. However, the present invention is not limited to any particular network architecture, such as VLANs, nor to any particular transport function or standard. That is, connections between devices can be accomplished using, for example, Asynchronous Transfer Mode (ATM), Transmission Control Protocol/Internet Protocol (TCP/IP), Synchronous Optical Network (SONET), Frame Relay (FR) protocol, or any other signal or connection format.

In the example of FIG. 1, a first provider edge (PE) router 114 and a first customer edge (CE) router 116 are linked to the first VoIP device 118, and a second PE router 124 and a second CE router 126 are linked to the second VoIP device 128. A PE router is, in general, a router situated as an interface between a network service provider (e.g., Internet service provider) and other network service providers. A CE router is, in general, a router situated as the interface between a customer network and a network of service providers. A PE router may not have knowledge of the type of traffic it is handling. A CE router can be used to forward traffic to a private network (e.g., a VPN) that uses private IP addressing.

The network 102 can include any number of network routing devices. One or more session border controllers (SBCs) may be implemented on any of the routers. Alternatively, one or more SBCs may be implemented on a separate device that is coupled to a router. In one embodiment, an SBC is implemented in hardware, as a linecard, for example. In another embodiment, an SBC is implemented in software. A combination of hardware and software may also be used. SBCs are described further in conjunction with the figures below.

Continuing with reference to FIG. 1, traffic from one of the devices (e.g., device 118) may encounter one or more SBCs en route to another device (e.g., device 128). There are at least two situations of particular interest to the discussion herein: 1) a situation in which devices 118 and 128 are members of the same VPN; and 2) a situation in which devices 118 and 128 are members of different VPNs. In either situation, it is important for an SBC to determine whether or not the devices 118 and 128 are members of the same VPN. It may also be important to identify which VPN the devices 118 and 128 are members of.

For example, the services or policies implemented by an SBC can depend on whether or not the devices 118 and 128 are members of the same VPN. If an SBC determines that the devices 118 and 128 are not members of the same VPN, then certain services or policies may be implemented by the SBC. On the other hand, if an SBC determines that the devices 118 and 128 are members of the same VPN, a different set of services and policies may be implemented by the SBC. In some instances, the services and policies implemented by the SBC may not be needed, and consequently the SBC may be bypassed. Bypassing an SBC can reduce processing overhead and shorten the communication path.

For example, consider an SBC that provides a protocol translation service to enable a call between two networks or devices that use different VoIP protocols. If the calling and called parties use the same VoIP protocol, the protocol translation service of the SBC is not needed. If no other SBC-implemented services or policies are needed, the call traffic may bypass the SBC.

In one embodiment, call traffic includes both a signal stream portion and a media stream portion. The signal stream includes, for example, information for call control functions, based on signaling protocols such as, but not limited to, Session Initiation Protocol (SIP), International Telecommunications Union (ITU) standard H.323 or H.248, or Media Gateway Control Protocol (MGCP). The media stream includes, for example, audio (voice) and/or video data, such as, but not limited to, RTP (Real Time Protocol) or RTCP (Real Time Control Protocol) streams for voice or video codecs. The signal and media streams are separable from each other. In general, the signal stream precedes the media stream—the signal stream is used to establish a connection between the calling and called parties, and once the connection is established, the media stream can be initiated.

Therefore, to be more specific with regard to the foregoing discussion, an SBC can receive and act on the signal stream associated with a particular call, while the media stream associated with the call either may be directed to (through) that SBC or may bypass that SBC. That is, generally speaking, the signal stream for a call will always pass through an SBC, while the media stream for a call may or may not bypass that SBC.

Consider again the example above of an SBC that provides a protocol translation service to enable a call between two networks or devices that use different VoIP protocols. If the calling and called parties use the same VoIP protocol, the protocol translation service of the SBC is not needed. If no other SBC-implemented services or policies are needed, the media stream associated with the call may bypass the SBC, although the signal stream associated with the call will pass through the SBC.

In general, the practice in which the media stream bypasses an SBC is referred to as "VPN optimization" or "media optimization," and is generally referred to herein as "optimization." More specifically, in some embodiments, optimization means that an SBC does not modify the session description portion of the SIP, MGCP, H.323 or H.248 signaling to force RTP or RTCP traffic through the SBC when traffic remains within the VPN. As will be seen, it is also possible to perform optimization on certain subnets within a VPN, while not optimizing other subnets.

Figure 2A:
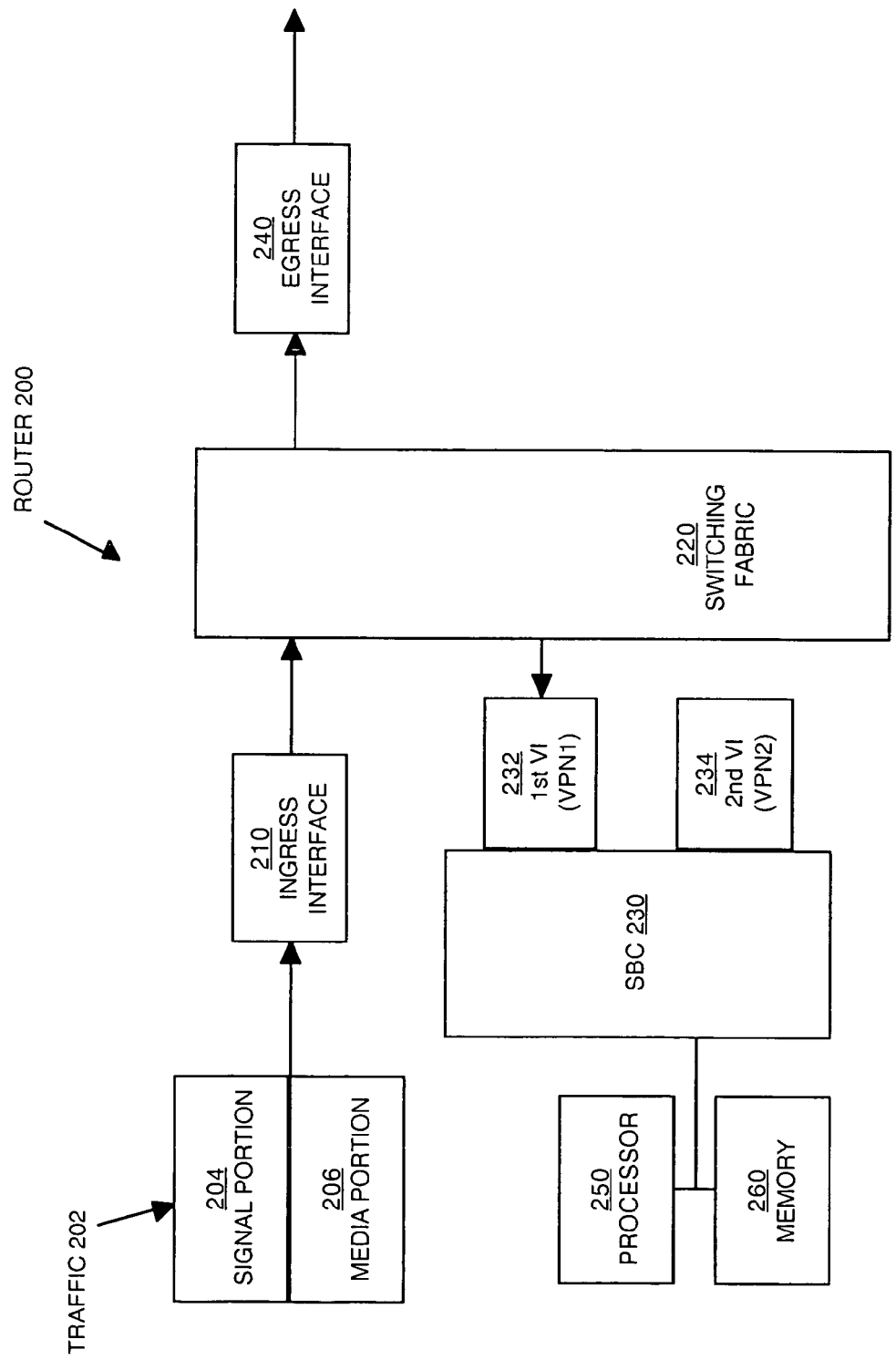
FIG. 2A is a block diagram of a network device according to one embodiment of the present invention.

FIG. 2A is a block diagram showing the flow of traffic through a network device (e.g., a router 200) according to one embodiment of the present invention. In the example of FIG. 2A, an SBC 230 is implemented on the router 200. As mentioned above, SBC 230 may instead be implemented on another device that is coupled to router 200, and SBC 230 may be implemented in hardware, in software, or in a combination of hardware and software.

According to embodiments of the present invention, SBC 230 is configured with a number of "virtual interfaces" (VI) exemplified by a first VI 232 and a second VI 234. The VIs 232 and 234 may also be referred to as service virtual interfaces. Generally speaking, a virtual interface is a point on the communication path that receives and evaluates traffic. More generally, a virtual interface is an element that has, but is not limited to, the functionality described below.

In configuring the virtual interfaces, VI 232 is associated with a particular VPN (e.g., VPN1) and VI 234 is associated with another VPN (e.g., VPN2). As such, all traffic from VPN1 with destination prefixes assigned to VI 232 is directed to VI 232. Other VPN1 traffic with different destination prefixes is routed as usual, without passing through VI 232. Similarly, all traffic from VPN2 with destination prefixes assigned to VI 234 is directed to VI 234.

According to embodiments of the present invention, a virtual interface and VPN are associated with each other by associating a unique VPN identifier (ID) with the virtual interface. In one embodiment, the unique VPN identifier is a globally unique "VPN-ID" specified according to RFC 2685. In another embodiment, the unique VPN identifier is a "VRF-name" (the VPN routing and forwarding name used by routers). In yet another embodiment, both a VPN-ID and a VRF-name are used.

A VPN-ID is suitable (unique) for inter-autonomous system (AS) traffic as well as intra-AS traffic, while a VRF-name is suitable (unique) for intra-AS traffic. In general, an autonomous system is a collection of IP networks and routers, perhaps under the control of one entity (e.g., a carrier or an Internet service provider), that presents a common routing policy to the Internet. "Intra-AS" refers to, for example, traffic within a particular carrier or provider network, while "inter-AS" refers to, for example, traffic across carrier/provider networks.

Significantly, by using a unique VPN identifier (e.g., a VPN-ID and/or a VRF-name) to identify a VPN, and by configuring a virtual interface to automatically associate traffic that it receives with that unique VPN identifier, the mapping tables that are conventionally used to map VLAN tags to customer IDs can be eliminated. Furthermore, because call traffic 202 is separable into a signal stream 204 and a media stream 206, the VPN-ID can be embedded in the signal stream 204 and/or used by an external control protocol (e.g., a protocol based on ITU H.248) to eliminate mapping tables from both the media and the signaling blocks (e.g., in "softswitches").

In one embodiment, a virtual interface receives traffic from only a single VPN (one-to-one mapping of VPN to VI). In another embodiment, a virtual interface receives traffic from more than one VPN (many-to-one mapping of VPNs to VI). In the latter embodiment, a virtual interface can be configured to map a particular subset of destination prefixes or IP addresses (subnet) to a particular VPN. Accordingly, the virtual interface can distinguish traffic from one VPN versus traffic from another VPN by looking at, for example, the subnet associated with the incoming traffic. A VPN can receive traffic from any number of virtual interfaces.

With reference to FIGS. 1 and 2A, in one embodiment, call traffic 202 is received at an ingress interface 210 of the router 200. The source of the call traffic 202 may be device 118, and the destination may be device 128, for example.

In one embodiment, the router 200 performs a Layer 3 (L3) lookup based on information in the signal stream 204. "Layer 3" refers to the network layer of the well known OSI (Open System Interconnection) model. The L3 lookup identifies the appropriate virtual interface to which the call traffic 202 is to be directed. In the example of FIG. 2A, the call traffic 202 is being sent from device 118 in VPN1, and so the L3 lookup identifies VI 232 as the appropriate virtual interface. Accordingly, the call traffic 202 (specifically, the signal stream 204) is routed by switching fabric 220 to VI 232.

Continuing with reference to FIGS. 1 and 2A, once the signal stream 204 is routed to the appropriate virtual interface (VI 232 in the example of FIG. 2A), SBC 230 also examines OSI Layers 4-7 (other signaling information) arriving from VI 232 to identify the destination of the call traffic 202. Based on the signaling information, as well as the virtual interface and local policy on the SBC 230, the call traffic 202 is directed to an appropriate egress interface 240. In one embodiment, the SBC 230 embeds the VPN identifier (e.g., a VPN-ID and/or a VRF-name) associated with the VI 232 into the signaling information (e.g., in signal stream 204), and also may modify the signaling information according to the egress interface configuration.

To summarize, in one embodiment, an SBC 230 on (or coupled to) a router 200 is configured with virtual interfaces 232 and 234 that belong to VPN1 and VPN2, respectively. Each of the VIs 232 and 234 is configured with a unique VPN identifier such as a VPN-ID and/or a VRF-name. The SBC 230 automatically associates the virtual interfaces, which are unique to SBC 230, to the respective unique VPN identifiers, which are either unique within the network (in the case of VPN-IDs) or unique within an autonomous system (in the case of VRF-names). When traffic is routed to SBC 230 from a particular VPN, that traffic is routed to the particular virtual interface associated with that VPN, and in this manner the virtual interface uniquely identities the VPN customer. Thus, SBC 230 is made VPN-aware without a mapping of VLAN tags to VPNs.

In one embodiment, SBC 230 embeds the unique VPN identifier in the signal stream 204 of the call traffic 202. In essence, the call traffic 202 is stamped with the unique VPN identifier. Consequently, other SBCs downstream of SBC 230, as well as other network elements—such as softswitches—downstream of SBC 230, are made aware of the VPN that is the source of the call traffic 202.

The unique VPN identifier can be embedded as a cookie in the signal portion 204. Other mechanisms can be utilized to include the unique VPN identifier in the call traffic 202. For example, the various signaling protocols, such as but not limited to SIP, ITU H.323, ITU H.248 and MGCP, include existing fields in the signal stream 204 that are available or can be modified to include the unique VPN identifier.

Figure 2B:
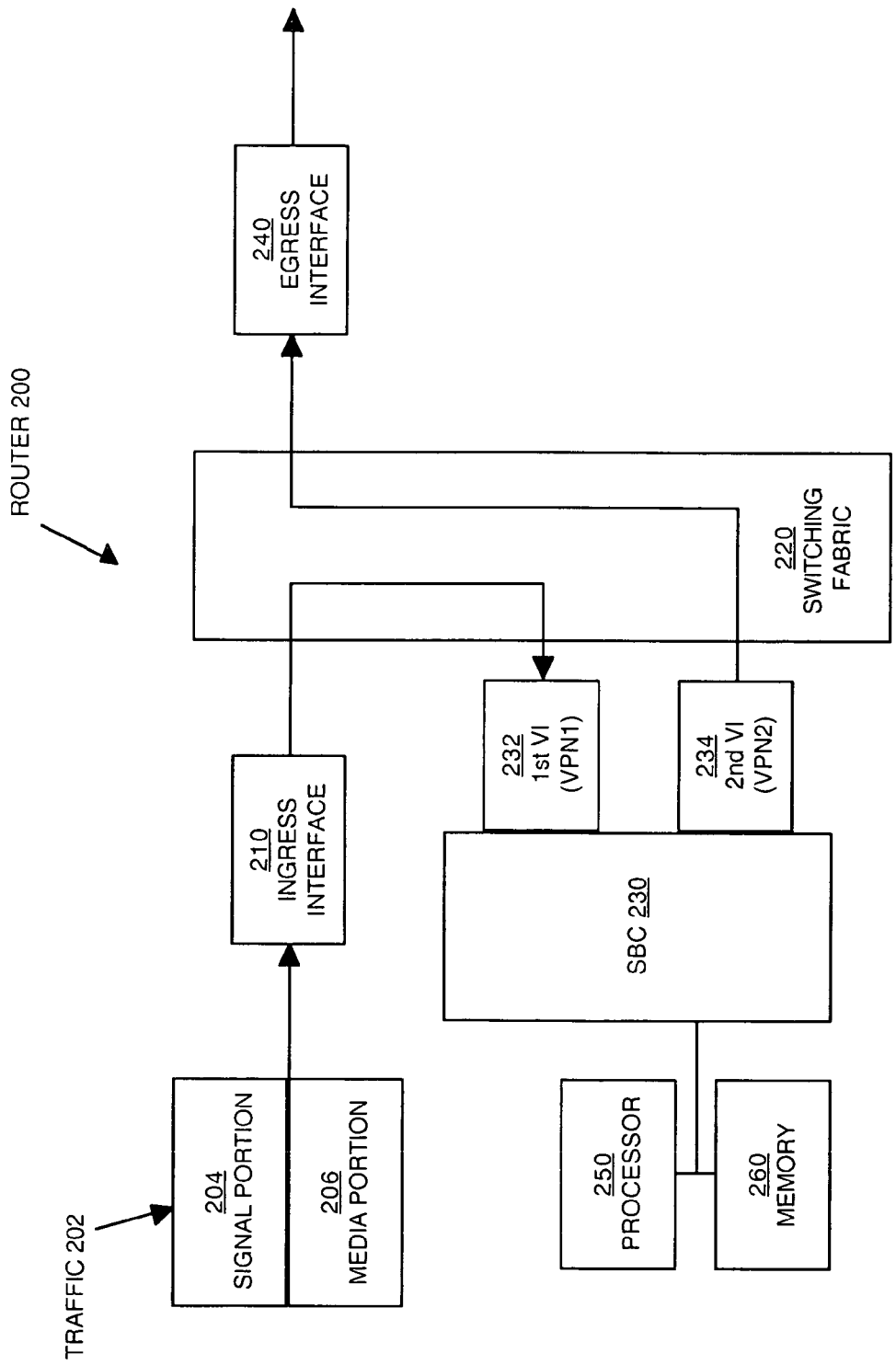
FIG. 2B illustrates an example of traffic flow through the network device of FIG. 2A.

FIG. 2B illustrates an example in which traffic goes from one VPN (e.g., VPN1) to another (e.g., VPN2). In this example, call traffic 202 arrives at VI 232 (which is associated with VPN1), is processed by the SBC 230, and is then directed to the appropriate egress interface 240 through VI 234 (which is associated with VPN2).

In one embodiment, SBC 230 performs an appropriate media-related service or implements an appropriate policy. In addition to the examples already mentioned herein, examples of media-related services include, but are not limited to, transcoding, network address translation (NAT), encryption, inter-VPN connectivity, and dual tone multi-frequency (DTMF) detection.

Figure 3A:
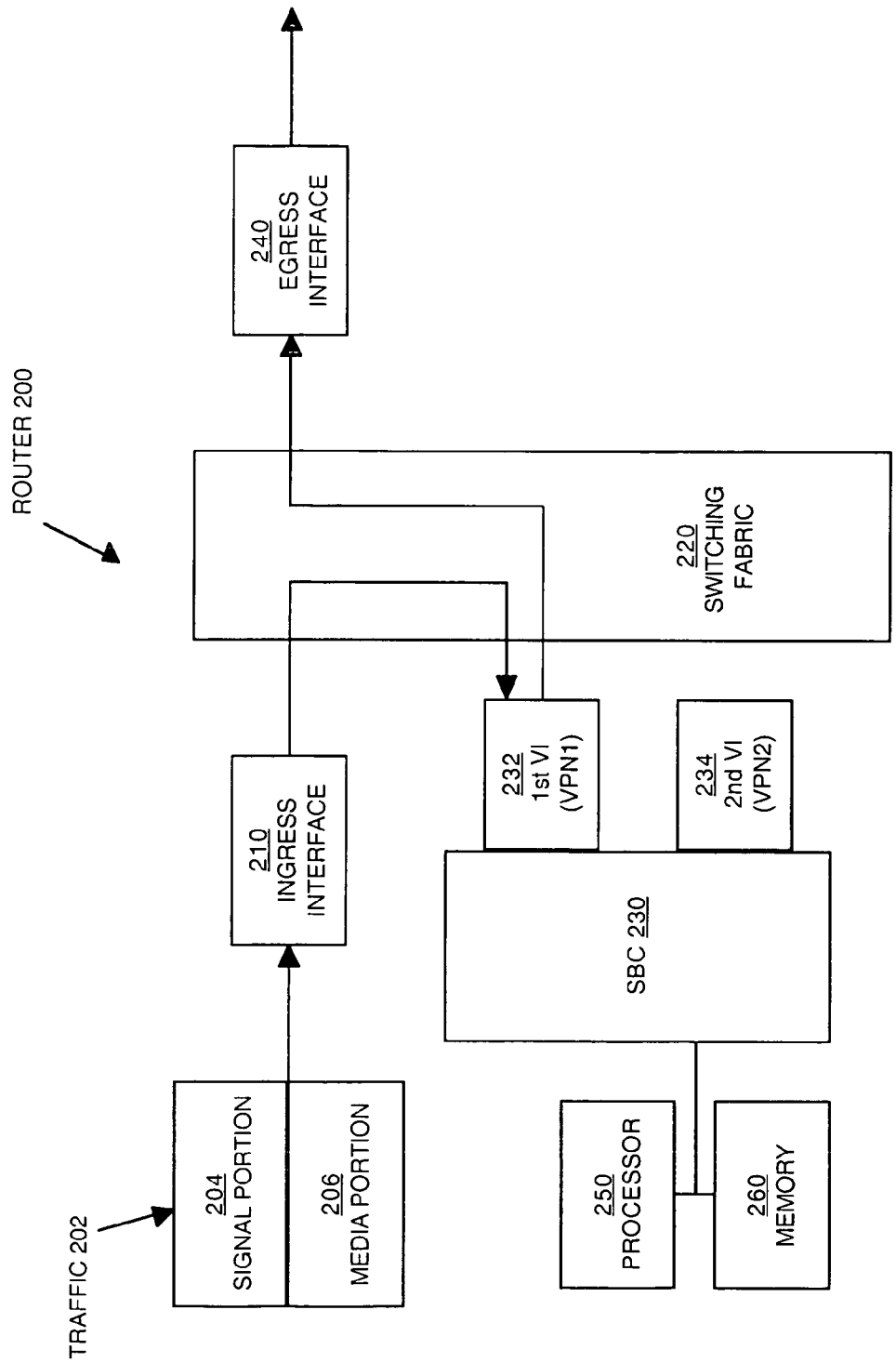
FIG. 3A illustrates another example of traffic flow through the network device of FIG. 2A.

FIG. 3A illustrates an example in which media or VPN optimization—in which media-related services may not be needed and where the media stream 206 may bypass the SBC 230—may be performed. In the present embodiment, VI 232 determines whether the source and destination of the call traffic 202 are in the same VPN. SBC 230 makes a decision to either force the media stream 206 through the SBC or to let the media stream 206 bypass the SBC (in either case, the signal stream 204 does not bypass the SBC).

In the example of FIG. 3A, VI 232 is associated with VPN1, which contains the source (device 118) of the call traffic 202. In one embodiment, if the destination of the call traffic 202 is also in VPN1 (that is, if device 128 is also in VPN1), then VPN/media optimization is performed. Specifically, in one embodiment, if the source and destination of the call traffic 202 (specifically, the signal stream 204) are both in VPN1 (VI 232), then VI 232 does not direct the traffic (specifically, the media stream 206) to SBC 230; instead, the traffic (specifically, the media stream 206) bypasses SBC 230. As mentioned above, in one embodiment, optimization means that SBC 230 does not modify the session description portion of the SIP, MGCP, H.323 or H.248 signaling to force RTP or RTCP traffic through the SBC when traffic remains within the VPN.

Continuing the example of FIG. 3A, in one embodiment, if the destination of call traffic 202 is not in VPN1, then VPN/media optimization is bypassed. Consequently, the media stream 206 is directed to SBC 230, which performs the appropriate media-related service or implements the appropriate policy, such as those mentioned previously herein.

Figure 3B:
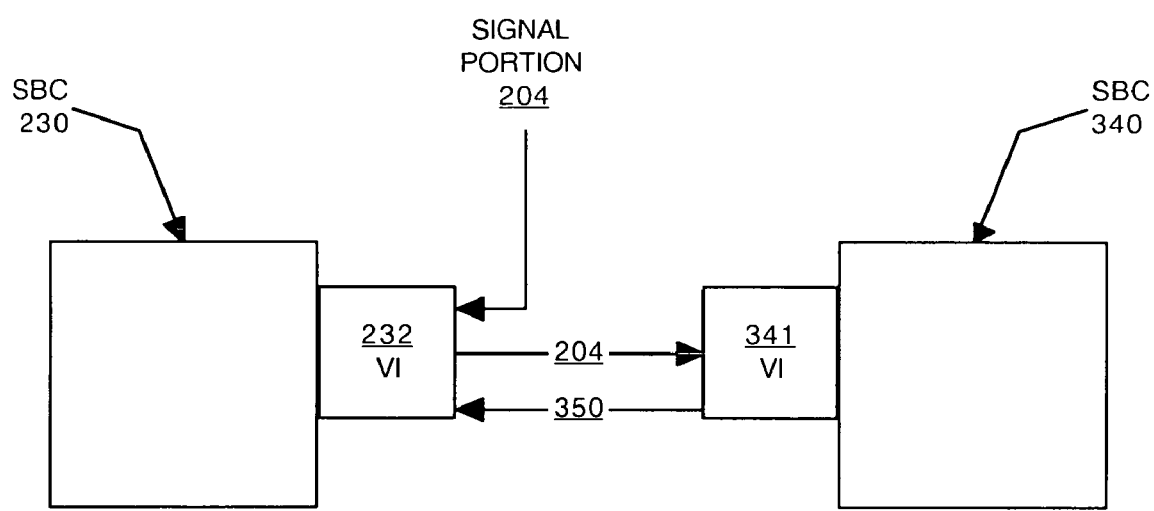
FIG. 3B is a block diagram showing the flow of signaling traffic between session border controllers according to one embodiment of the present invention.

FIG. 3B is a block diagram showing the flow of signaling traffic between two session border controllers 230 and 340 according to one embodiment of the present invention. The SBCs 230 and 340 may be on the same network device or on different devices.

As previously described herein, a virtual interface 232 is configured on SBC 230 and another virtual interface 341 is configured on SBC 340. In the present embodiment, signal stream 204 of call traffic 202 (FIG. 3A) is received at VI 232. In this embodiment, before SBC 230 (VI 232) makes a decision with regard to VPN or media optimization, the unique VPN identifier associated with the source of the call traffic 202 is embedded in the signal stream 204, which is forwarded to VI 341. Thus, the signaling information is routed through the network to the correct destination and, once the connection is made, the media stream 206 commences (e.g., the caller begins to speak). In one embodiment, SBC 340 (VI 341) makes the decision with regard to whether or not optimization is to be performed, and communicates this decision to VI 232 using a signal 350.

Depending on the configured policies on SBC 230 and SBC 340, the media stream 206 can be controlled through modification of the signal stream 204 prior to initiation of the media stream 206. If VPN/media optimization is deemed to be required, then the media stream 206 bypasses both SBCs 230 and 340. However, if VPN/media optimization is not required, then the media stream 206 passes through one or both of the SBCs 230 and 340.

To summarize, if the source and destination of the call traffic are terminated on different SBCs that serve the same VPN, either of the SBCs can perform optimization. If the traffic traverses one or more entities (e.g., a softswitch or an SIP proxy) before reaching the downstream SBC (e.g., SBC 340), the unique VPN identifier embedded in the signal portion of the traffic will be passed through those entities so that the downstream SBC (e.g., SBC 340) can be made aware of the source of the call, can determine whether the source and destination are in the same VPN, and can make a decision with regard to optimization.

Figure 4:
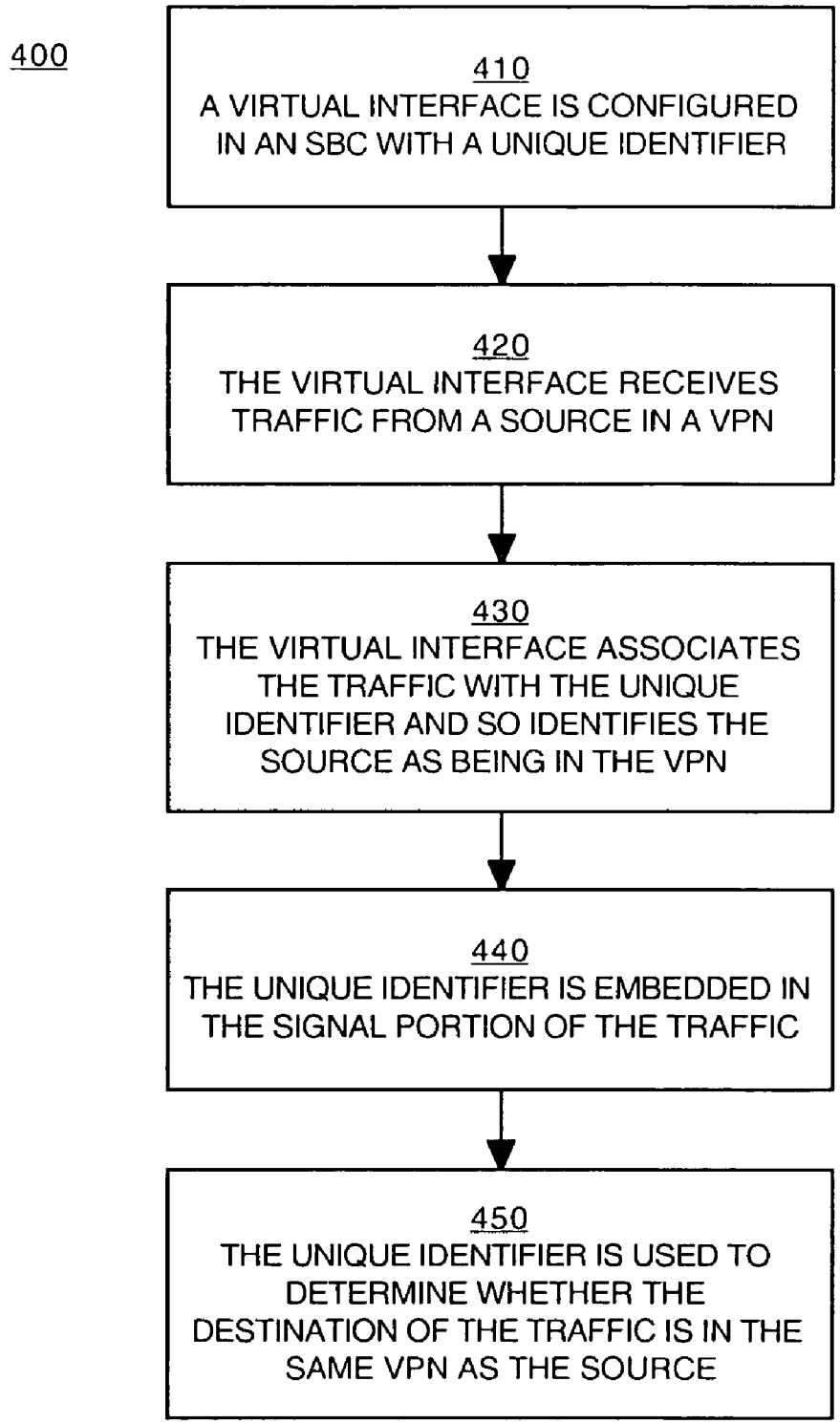
FIG. 4 is a flowchart of a method for managing traffic at a virtual interface of a session border controller according to an embodiment of the present invention.

FIG. 4 is a flowchart 400 of a method for managing traffic at a virtual interface of a session border controller according to an embodiment of the present invention. With reference to FIG. 2A, flowchart 400 can be implemented in one embodiment as software program instructions stored in a computer-readable memory unit 260 and executed by a central processor 250 in an intelligent network device or computer system (e.g., router 200). In one embodiment, the method of flowchart 400 is implemented by SBC 230 of FIG. 2A.

In block 410 of FIG. 4, in one embodiment, a virtual interface is configured in an SBC and is associated with a unique identifier. More specifically, the virtual interface is associated with a particular VPN and will receive all traffic from that VPN. Note this does not preclude traffic from that VPN being routed to other virtual interfaces, nor does it preclude traffic from other VPNs from being routed to the virtual interface. In the latter situation, the SBC is configured to distinguish traffic from one VPN versus traffic from another VPN. In one embodiment, the unique identifier is a VPN-ID per RFC 2685, and in another embodiment, the unique identifier is a VRF-name.

In block 420, the virtual interface receives traffic from a source in the VPN. In one embodiment, the traffic includes a signal portion and a media portion, where the signal portion and the media portion are separable. In another embodiment, the traffic is associated with a VoIP call.

In block 430, the virtual interface associates the traffic with the unique identifier. As such, the virtual interface identifies the source of the traffic as being in the VPN mentioned above in connection with block 410.

In block 440, in one embodiment, the unique identifier is embedded in the signal portion of the traffic. The signal portion of the instance of traffic can be forwarded to another network element, perhaps another SBC.

In block 450, the unique identifier is used to determine whether the source of the traffic and the destination of the traffic are in the same VPN. Depending on the result of this determination, and depending on the policy in place, the media portion of the traffic is either directed to the SBC or will bypass the SBC. As previously described herein, the decision on whether the SBC is bypassed or not may be made by a downstream SBC and communicated back to the upstream SBC.

FIG. 5 is a flowchart 500 of a method for managing traffic in a network according to an embodiment of the present invention. With reference to FIG. 3A, flowchart 500 can be implemented in one embodiment as software program instructions stored in a computer-readable memory unit 260 and executed by a central processor 250 in an intelligent network device or computer system (e.g., router 200). In one embodiment, the method of flowchart 500 is implemented by SBC 230 of FIGS. 3A and 3B; in another embodiment, the method of flowchart 500 is performed by SBC 340 of FIG. 3B.

In block 510 of FIG. 5, a signal portion of traffic is received at an SBC, and more specifically, at a virtual interface of the SBC. The traffic is en route from a source in a VPN to a destination. In one embodiment, a unique identifier associated with the VPN is embedded in the signal portion.

In block 520, the unique identifier provided in the signal portion is used to determine whether the source and destination of the VPN are in the same VPN.

In block 530, in one embodiment, the media portion of the instance of traffic is directed to the SBC if the destination is not in the same VPN as the source.

In block 540, in one embodiment, the media portion bypasses the SBC if the destination is in the same VPN as the source.

Returning to block 520, as mentioned above, the determination as to whether the source and destination are in the same VPN can be made by one SBC and communicated to another SBC. Likewise, either of the SBCs may receive the media portion for processing.

Although specific steps are disclosed in flowcharts 400 and 500 of FIGS. 4 and 5, respectively, such steps are exemplary. That is, embodiments of the present invention are well suited to performing various other (additional) steps or variations of the steps recited in flowcharts 400 and 500. The steps in flowcharts 400 and 500 may be performed in an order different than presented, and not all of the steps in flowcharts 400 and 500 may be performed.

In summary, embodiments in accordance with the present invention provide a friendly solution for configuring SBCs so that the SBCs are made VPN-aware without the complication and overhead of mapping tables.

Embodiments of the present invention are thus described. While the present invention has been described in particular embodiments, it should be appreciated that the present invention should not be construed as limited by such embodiments, but rather construed according to the below claims.

What is claimed is:

1. A method comprising:
   receiving a signal portion of traffic en route from a source in a source virtual private network (VPN) to a destination, said signal portion having embedded therein an identifier that uniquely identifies the source VPN;
   accessing said identifier;
   determining whether a destination VPN is a same or different VPN than the source VPN, according to the identifier; and
   if the source VPN and the destination VPN are different VPNs then directing a media portion of said traffic to a first session border controller (SBC).

2. The method of claim 1 wherein said identifier comprises a VPN identifier or a VPN routing and forwarding name (VRF-name), or combinations thereof.

3. The method of claim 1 wherein said identifier comprises an inter-autonomous system identifier that is unique across multiple carrier networks or comprises an intra-autonomous system identifier that is unique only within a carrier network.

4. The method of claim 1 further comprising directing a media portion of said traffic to said first SBC independent of mapping tables for associating virtual local area network (VLAN) tags to one or more VPNs.

5. The method of claim 4 wherein said receiving and accessing are performed at a second SBC that is downstream of said first SBC, wherein information that indicates whether said destination is in said VPN is communicated upstream to said first SBC prior to said directing.

6. The method of claim 1 wherein said receiving and accessing are performed at said first SBC.

7. The method of claim 1 wherein said first SBC performs a type of service on said media portion if said media portion is directed to said first SBC.

8. A computer-usable medium having computer-readable program code embodied therein for causing a device to execute a method for handling traffic in a network comprising a plurality of session border controllers (SBCs), said method comprising:
   receiving a call from a source in a source VPN;
   associating a signal portion of the call with a unique identifier, wherein the unique identifier identifies the source VPN of the call and wherein a means for associating the signal portion of the call with the unique identifier is part of the source VPN;
   determining whether a destination VPN is a same VPN as the source VPN based on the unique identifier; and
   routing a media portion of the call through one or more SBCs based on the determination.

9. A system for handling traffic in a network comprising a plurality of session border controllers (SBCs), said system comprising:
   means for receiving a signal portion of traffic en route from a source in a virtual private network (VPN) to a destination, said signal portion having embedded therein an identifier that uniquely identifies said VPN;
   means for accessing said identifier to determine whether said destination is also in said VPN; and
   means for directing a media portion of said traffic to a first SBC if said destination is outside of said VPN, wherein otherwise said media portion bypasses said first SBC.

10. A device comprising:
    a plurality of communication interfaces;
    one or more processors coupled to said interfaces; and
    a memory unit coupled to said one or more processors, said memory unit containing instructions that when executed implement a computer-implemented method for handling traffic in a network comprising a plurality of session border controllers (SBCs), said method comprising:
    receiving a signal portion of traffic en route from a source in a virtual private network (VPN) to a destination, said signal portion having embedded therein an identifier that uniquely identifies said VPN;
    accessing said identifier to determine whether said destination is also in said VPN; and
    making a decision whether to direct a media portion of said traffic to a first SBC according to whether said destination is inside of said VPN.

11. The device of claim 10 wherein said method further comprises directing said media portion of said traffic to said first SBC if said destination is outside of said VPN, wherein otherwise said media portion bypasses said first SBC.

12. The device of claim 11 wherein said receiving and accessing are performed at a second SBC that is downstream of said first SBC, wherein information that indicates whether said destination is in said VPN is communicated upstream to said first SBC prior to said directing.

13. The device of claim 11 wherein said receiving and accessing are performed at said first SBC.

14. The device of claim 11 wherein said first SBC is configured to perform a type of service on said media portion if said media portion is directed to said first SBC.

15. The device of claim 11 wherein said identifier comprises an intra-autonomous system identifier that is unique only within a carrier network.

16. The device of claim 11 wherein said identifier comprises an inter-autonomous system identifier that is unique across multiple carrier networks.

* * * * *